July 5, 1960     E. P. ANDERSON     2,944,236

ELECTRICAL TEMPERATURE MEASURING DEVICE

Filed March 2, 1956

INVENTOR.
EDWARD P. ANDERSON
BY

ATTORNEY

United States Patent Office 2,944,236
Patented July 5, 1960

2,944,236
ELECTRICAL TEMPERATURE MEASURING DEVICE

Edward P. Anderson, Teaneck, N.J., assignor, by mesne assignments, to Engelhard Industries, Inc., Newark, N.J., a corporation of New Jersey Filed Mar. 2, 1956, Ser. No. 569,204

2 Claims. (Cl. 338—26)

The present invention deals with a temperature measuring device and more particularly with a transducer means for surface pyrometry.

It is an object of the present invention to provide a novel means for measuring the surface temperature of a body. It is another object of this invention to provide a transducer means for surface pyrometry including means whereby said transducer is adapted for bonding to a body surface for the measurement of the temperature thereof. Other objects and advantages will become apparent from the description hereinafter following and the drawings forming a part hereof, in which:

Figure illustrates a schematic top view of the temperature measuring device according to this invention as shown on a fragmentary portion of a surface.

Figure 1:
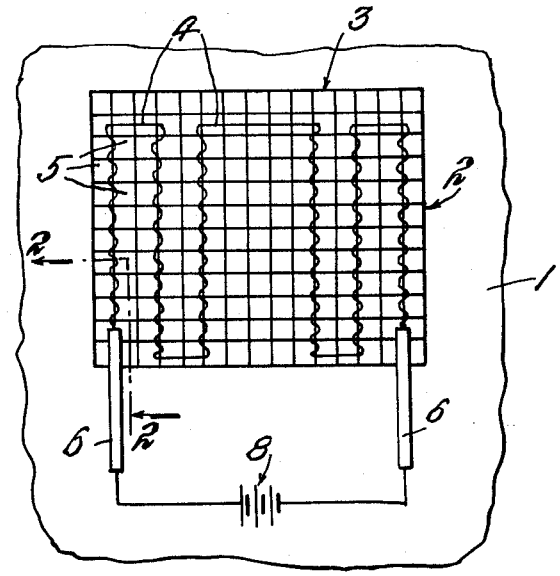
Figure 2:
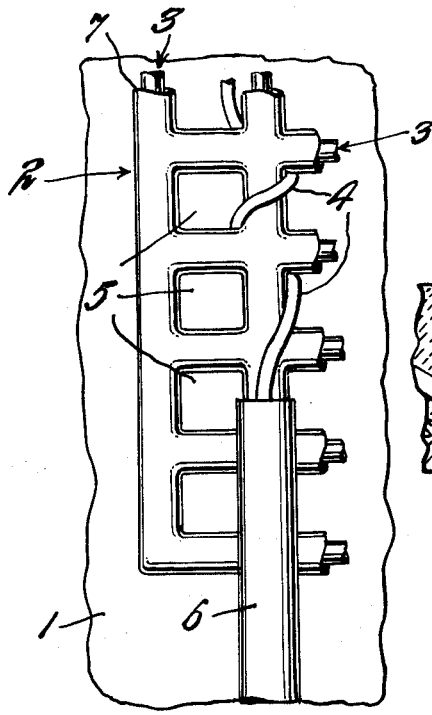
Figure 4:
Figure 3:
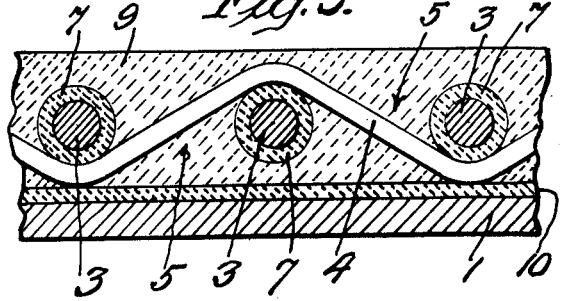

Figure 2 illustrates an enlarged fragmentary view of the temperature measuring device along lines 2—2 of Figure 1, and Figure 3 illustrates a cross-sectional fragmentary view of the temperature measuring device as embedded in a cement and bonded to a body, and Figure 4 illustrates a fragmentary view of a modified form of grid according to the invention.

According to the invention, the measuring device or transducer comprises a support member in the form of a grid or screen having suitable openings or apertures therethrough and through which a temperature responsive means, e.g. wire, is preferably interlaced or otherwise connected to said support, and whereby said openings operate as a means through which a cement or bonding agent is enabled to tenaciously bond the support, including said temperature responsive means, to the surface of a body and to maintain the bond under variable temperature conditions.

Referring to Figures 1 and 2, a body, e.g. a metal body 1, is provided with a temperature measuring means generally referred to by the numeral 2, and which comprises a perforated plate or a screen support 3. The plate or screen may be of metallic composition such as tungsten or platinum with a coating of insulation material as shown by Figure 2, or a non-metallic composition such as fused quartz, mica, or the like as shown by Figure 4. A temperature responsive means, 4, e.g. electrically conductive wire such as platinum wire, is preferably interlaced over at least a part of the area of said support by interlacing through the openings 5 and connecting said wire to terminal leads 6. The support itself may be adapted to act as the temperature responsive means with or without the temperature responsive means 4.

While various modifications are herein contemplated, Figures 2 and 3 illustrate a metallic screen 3, or the like, having a thin layer or coating 7 of electrically insulating material thereon and preferably over which the electrical conductor or temperature responsive wire 4 is interlaced. The electrically insulating material 7 may be applied as a high temperature resisting lacquer or ceramic cement, compositions of which are known to the art. The said wire 4 is provided with terminal leads 6 which are advantageously bonded to the support 3 for connection to a source of electrical energy 8 as illustrated in Figure 1. A temperature indicating means is not illustrated since such is within the knowledge of those versed in the art.

Having provided the measuring device 2 as hereinabove described, the device is placed on a surface, the temperature of which is to be measured, and bonded thereto by means of a cement 9, for example, a high temperature resisting cement, preferably of ceramic composition, said cement bonding said temperature responsive wire 4, and its support 3, to the body 1, through the said openings 5, as illustrated by Figure 3. Advantageously, the cement 9, and coating 7, are of the same composition whereby a substantially integral bond is provided to preclude differences in coefficient of expansion thereof. Also, the said bonding material 9, is provided with a thickness sufficient to encase the entire device 2, excepting a portion of the leads 6, which is left uncovered for connection with the source of electrical energy.

While Figure 3 shows a layer of bonding material 10, between the body 1, and the measuring device 2, the measuring device 2 may directly contact the surface of the body 1.

Various modifications of invention herein described are contemplated within the scope of the appended claims.

What I claim is:

1. A transducer for surface pyrometry comprising a grid member having a coating of an electrically insulating material thereon, a continuous electrically conductive wire interlaced on the coated grid member and having terminal leads connected to the ends thereof, and a coating of an electrically insulating material over the assembly.

2. A transducer according to claim 1 in which both coatings of insulating material have the same composition.

References Cited in the file of this patent

UNITED STATES PATENTS

| | | |
|---|---|---|
| 1,615,294 | Turner | Jan. 25, 1927 |
| 1,858,265 | Dahlstrom | May 17, 1932 |
| 2,251,697 | Van Doam et al. | Aug. 5, 1941 |
| 2,686,244 | Dahm et al. | Aug. 10, 1954 |
| 2,817,737 | Morris | Dec. 24, 1957 |

FOREIGN PATENTS

| | | |
|---|---|---|
| 187,739 | Great Britain | Nov. 2, 1922 |
| 464,810 | Italy | July 23, 1951 |
| 493,533 | Great Britain | Jan. 4, 1937 |